Figure 1:
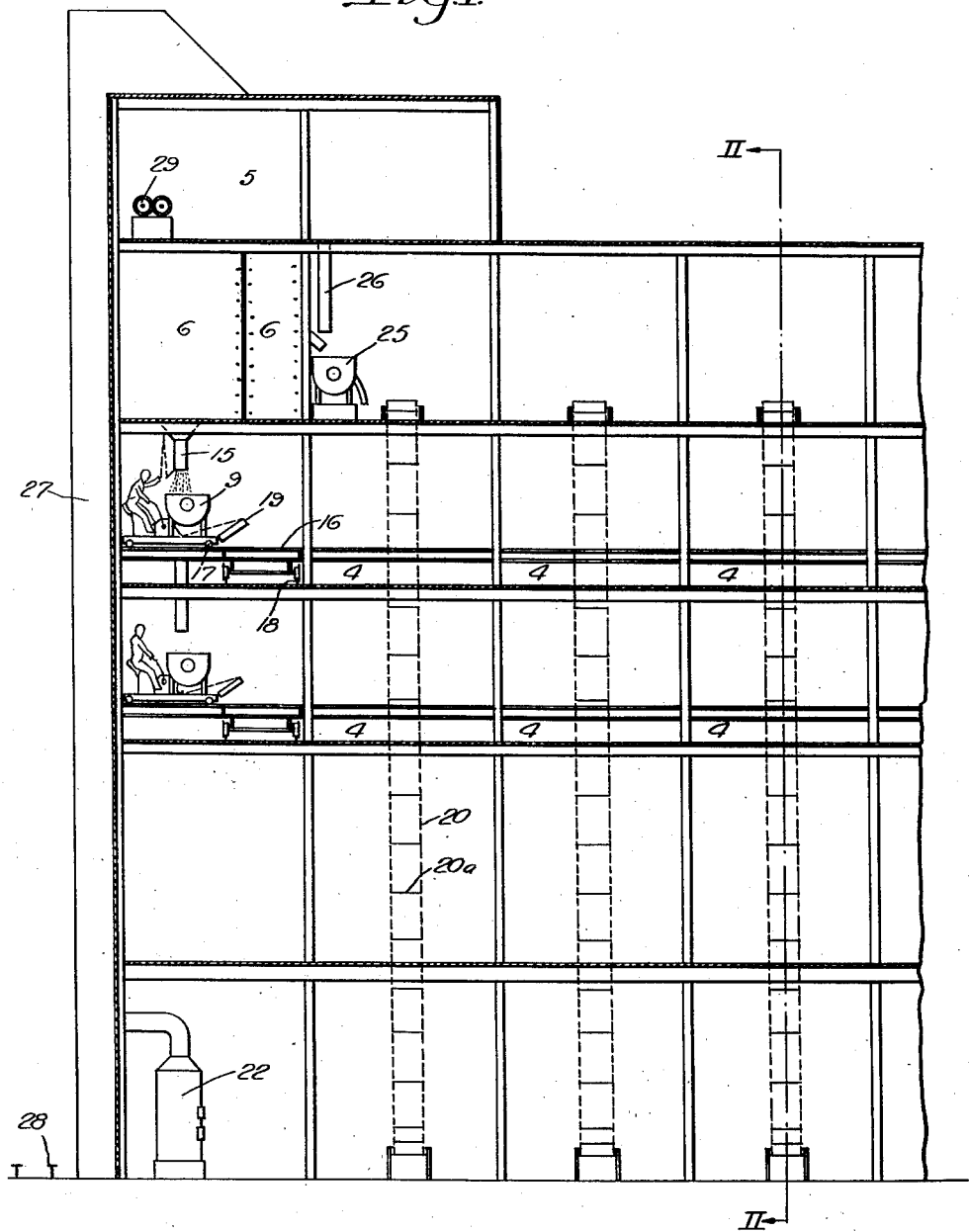

Dec. 8, 1931.  A. HENDERSON  1,835,158
MAKING CEMENTITIOUS ARTICLES
Filed July 28, 1928  2 Sheets-Sheet 1

UNITED STATES PATENT OFFICE

ALBERT HENDERSON, OF PITTSBURGH, PENNSYLVANIA, ASSIGNOR, BY DIRECT AND MESNE ASSIGNMENTS, TO HENDERSON & HATCHER, INC., OF PITTSBURGH, PENNSYLVANIA, A CORPORATION OF DELAWARE

MAKING CEMENTITIOUS ARTICLES

Application filed July 28, 1928. Serial No. 295,869.

This invention relates to the making of cementitious articles, and provides a plant for their manufacture whereby an improved product may be made at materially reduced cost.

It is customary practice in the manufacture of concrete blocks, slabs and the like, to form and cure the articles and then store them in the open for ageing. A cementitious article, such as a concrete block, does not develop its final strength until it has aged from ten days to two weeks. After the curing it is relatively strong, but is still in the "green" state and needs ageing before it develops its ultimate strength.

Under the present arrangement the articles are frequently damaged and reduced in quality during the ageing period because they are exposed to rain, sun and wind. They dry out too rapidly or not rapidly enough. The blocks at the bottom of the pile are likely to retain their moisture for too long a period, while those near the top, being exposed to the direct rays of the sun, are likely to be too rapidly dried. In winter the bottom blocks are pitted and honey-combed by frost while the top blocks frequently deteriorate in quality because of the formation of ice thereon. Many blocks are broken during handling because of the freezing conditions. It is impossible to scientifically control the ageing of the blocks under such conditions.

Another serious objection to the present methods is that the cost of manufacture is high. A large area is required for a plant, and the cost of handling represents a large item in the total manufacturing cost. There is also danger of breakage in the handling because the blocks must be transferred from the mold to the curing chamber, and from the curing chamber to cars for transportation to the storage yard, after which they must be removed from the cars and stacked. In each handling there is a possibility of breakage, and in practice many blocks are discarded.

By reason of the fact that a large yard area is required, plants of this character are generally in outlying districts, thus increasing the cost of hauling the product from the manufacturing plant to the place of use.

I provide a plant comprising a storage room and an article forming unit thereabove. This forming unit is preferably of the character described and claimed in my copending application Serial No. 241,650, filed December 21, 1927, which has become Patent No. 1,744,309, whereby the articles may be formed and cured without movement. After forming and curing they may be moved to the storage room with a single handling, thereby removing a fruitful cause of breakage. The character of the single handling required is such that breakage is reduced to an absolute minimum.

The blocks being placed in a storage room for ageing, the ageing process may be scientifically controlled. The blocks are sheltered from the wind, the rain and the sun, and the temperature and humidity conditions may be nicely controlled. Moreover, such conditions may be made uniform for all the blocks in the storage room, an impossibility when the blocks are stored and aged in the open.

Heating means are provided for maintaining the proper conditions in the storage room, and the heat rises, thus maintaining the proper temperature conditions around the forming unit. By reason of the arrangements above described an improved product results.

With my arrangement the cost of manufacture is materially reduced. As above stated, the handling of the articles between the forming unit and the storage room is reduced to a minimum. The cost of rehandling the blocks after they have aged is also minimized. I provide run-ways through the plant for trucks so that they may be loaded directly from the storage rooms. A commercial plant must make a variety of different sized blocks and slabs in order to meet the commercial demands, and most orders call for a number of articles of different kinds. With the old plant lay-outs it is necessary for the truck to travel over a wide expanse of storage yard in order to make up the load. This is eliminated in my improved manufacturing plant. A further reduction in cost is effected by the provision of mixing and filling devices for the article forming units. The raw material is stored above the level of the forming units and is supplied by gravity to the mixer. Provision is made for running the mixer over the forming units so as to fill the molds at a minimum of expense.

Figure 2:
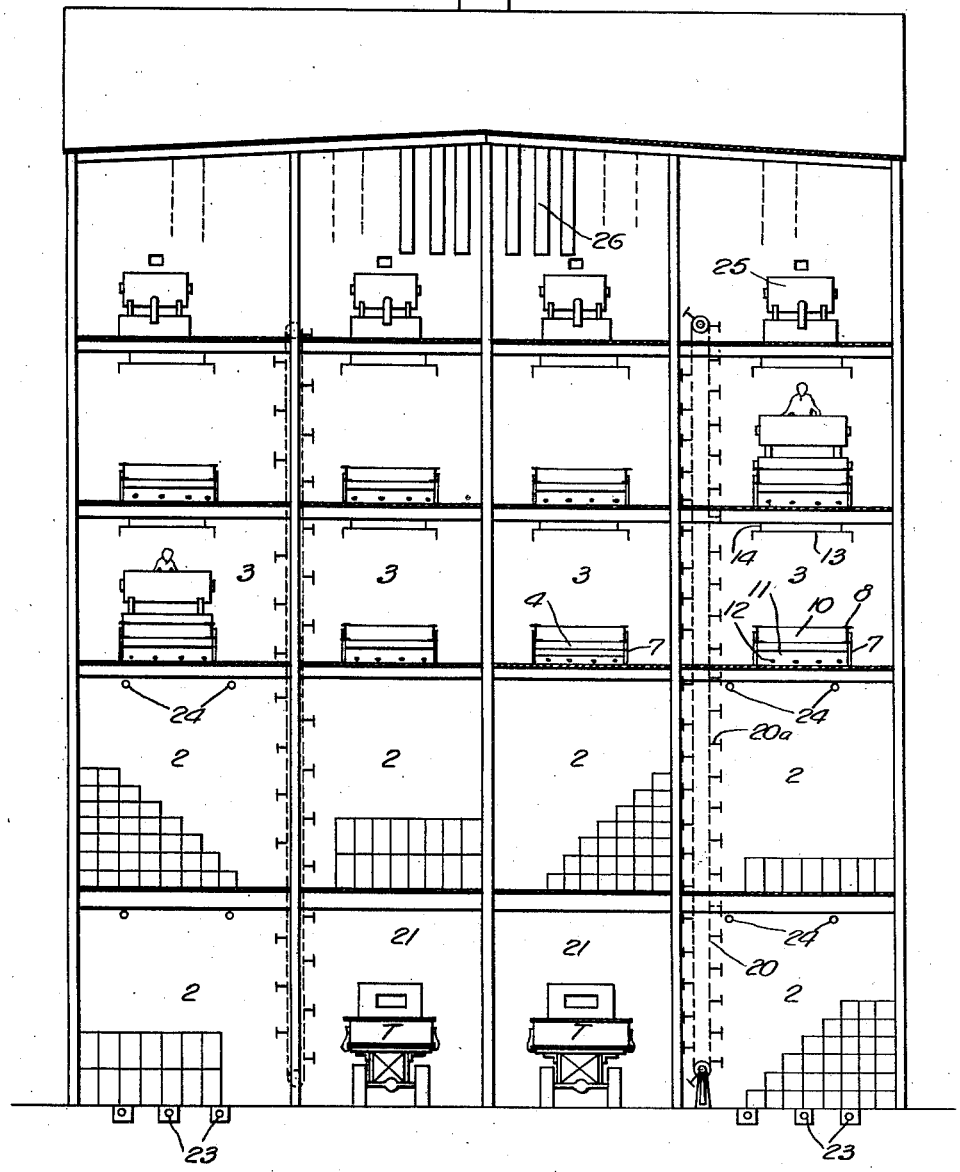

In the accompanying drawings illustrating the present preferred embodiment of my invention, Figure 1 is a longitudinal vertical section broken away through a plant constructed according to my invention, and Figure 2 is a transverse section taken on the line II—II of Figure 1.

The drawings show a building which is five stories high. The first and second stories comprise storage bays 2 for concrete blocks, slabs and the like. The third and fourth stories comprise bays 3, each of which contains a long article forming unit indicated generally by the reference character 4. These units are employed for the manufacture of blocks, half blocks, slabs, partition units and the like. The fifth story is devoted to the manufacture of miscellaneous products, such as colored stucco, colored stone, garden furniture and the like. At one end of the plant there is provided a penthouse 5 for the storage of Portland cement, gypsum and the like. Sand, gravel and cement bins 6 are provided on the fifth floor.

The units 4 each comprise side walls 7 topped by I-beams 8 which form running tracks for a combined mixing and filling unit indicated generally by the reference character 9. Each unit 4 is provided with molds 10 above an air space 11 having steam pipes 12 therein. Covers 13 suspended by cables 14 to counter-balances (not shown) are provided for the units. This arrangement is more fully described and is claimed in my copending application above referred to.

In operation the molds 10 are assembled and made ready for pouring. The mixing and filling device is positioned, as shown in Figure 1, below chutes 15 leading from the bins 6 whereby the raw materials may be fed to the mixer under the control of the operator. After the cement has been mixed the unit 9 is moved to a transfer truck 16. The unit runs on wheels 17 and the transfer truck 16 is provided with tracks to accommodate it. The transfer truck 16 runs on rails 18 extending transversely of the building so that it may be brought into register with the unit in any one of the bays 3. When it is properly positioned in alignment with one of such units, the mixing and filling device 9 is run along the I-beams 8 and the material is fed to the molds. A screeding device 19 is provided on the unit 9 for leveling the material in the molds.

The operation of the screeding device 19 and the movement of the unit 9 is effective for vibrating the molds sufficiently to cause gravity to compact the poured material therein and insure the production of sound articles of uniform porosity.

After a unit has been filled and screeded the covers 13 are lowered and the articles are cured. After the curing has been effected the covers 13 are raised and the cured articles are transferred to a vertical chain conveyor 20. This conveyor is provided with shelves 20a upon which the formed blocks or slabs may be placed and lowered to the proper storage chamber 2. The articles are lowered by their own weight and the handling is reduced to a minimum. A number of such chain conveyors are provided so that the amount of handling can be reduced to a minimum. One or more of the conveyors will be provided with a positive drive so that it can be used as an elevator, if desired, for the return of undelivered articles to the proper storage bay.

It will be noted that a chain conveyor is placed between pairs of article forming units so that it may be used for transferring articles from each.

The conveyors are located adjacent runways 21 for trucks T. The trucks may thus run through the plant and be loaded with a minimum of effort.

A heater 22 is provided for supplying steam to the pipes 12. It is also connected to steam pipes 23 beneath the storage bays 2 on the first floor of the plant. The steam may be turned into these pipes so as to regulate the temperature in the bays. The heat rises and insures maintenance of the proper temperature conditions in the upper storage bays, as well as in the bays 3 where the articles are formed.

Sprinkling pipes 24 are provided in the top of each bay so as to supply the proper amount of moisture for ageing. With this arrangement the ageing of the blocks may be properly controlled regardless of weather conditions. The spray pipes do not freeze in winter time, as would be the case if outside storage were used, and the moisture in the storage rooms can be readily controlled, as evaporation due to cold dry winds is eliminated.

Stucco mixers 25 supplied with material by chutes 26 leading from the penthouse 5 are shown on the fifth story of the plant. The raw materials are carried to the penthouse 5 and to the bins 6 by an elevator 27, whose lower end is located adjacent railroad tracks 28 for the spotting of cars of raw material. A cinder crusher 29 is provided in the penthouse 5 for reducing cinders to proper size before they are sent to storage in the bin 6.

For matter shown but not claimed in this case, reference is made to my copending applications, Serial Nos. 410,974, filed December 2, 1929; 408,988, filed November 15, 1929; and 302,690, filed August 29, 1928.

I have illustrated and described a preferred embodiment of the invention. It will be understood, however, that it is not limited to the form shown, but may be otherwise embodied or practiced within the scope of the following claims:

I claim:—

1. In the process of making cementitious articles, the steps consisting in forming the articles in molds and allowing the same to take their initial set, artificially supplying heat to the molds and holding the articles in such molds until they have acquired their final set, then after such final set but while the articles are still in the green state, transporting the same to an aging chamber wherein the articles are protected from the elements, and there aging the same while artificially controlling the temperature and humidity.

2. In the process of making cementitious articles, the steps consisting in forming the articles in molds and allowing the same to take their initial set, artificially supplying heat to the molds and holding the article in such molds until they have acquired their final set, then after such final set but while the articles are still in the green state, transporting the same to an aging chamber wherein the articles are protected from the elements, and there aging the same while artificially controlling the temperature.

3. In the process of making cementitious articles, the steps consisting in forming the articles in molds and allowing the same to take their initial set, artificially supplying heat to the molds and holding the articles in such molds until they have acquired their final set, then after such final set but while the articles are still in the green state, transporting the same to an aging chamber arranged below the forming molds, and wherein the articles are protected from the elements, and there aging the same while artificially controlling the temperature and humidity, said forming molds being above said aging chamber, whereby heat from below aids in maintaining proper temperature thereof.

4. In combination, a machine for forming cementitious articles, an aging chamber for the product thereof, and means for artificially controlling the temperature and humidity of the aging chamber.

5. In combination, a machine for forming cementitious articles, an aging chamber for the product thereof, and means for artificially controlling the temperature and humidity of the aging chamber, the machine being so placed with reference to the aging chamber as to be heated in part by heat from said aging chamber.

6. In combination, a machine for forming cementitious articles, an aging chamber for the product thereof, and means for artificially controlling the temperature and humidity of the aging chamber, the machine being arranged above the aging chamber whereby the heat from the aging chamber assists in maintaining desired temperature conditions at the machine.

7. In combination, a machine for forming cementitious articles, an aging chamber for the product thereof, means for artificially controlling the temperature and humidity of the aging chamber, and a conveyor extending from the machine to the aging chamber whereby articles may be taken in the green state from the machine and transported to the aging chamber with a minimum of breakage or strain.

8. In combination, a machine for forming cementitious articles, an aging chamber for the product thereof, means for artificially controlling the temperature and humidity of the aging chamber, and means for applying heat adjacent the machine for effecting a cure of the articles therein.

9. In combination, a machine for forming cementitious articles, an aging chamber for the product thereof, and means for artificially controlling the humidity of the aging chamber.

10. In combination, a machine for forming cementitious articles, an ageing chamber for the product thereof and means for artificially controlling the temperature of the ageing chamber.

In testimony whereof I have hereunto set my hand.

ALBERT HENDERSON.